INVENTOR.
R. F. KRUEGER
G. P. MALY
BY
ATTORNEY 3,113,621
SUBTERRANEAN WELL TREATMENTS USING A VIBRATIONAL FIELD
Roland F. Krueger, Anaheim, and George P. Maly, Fullerton, Calif., assignors to Union Oil Company of California, Los Angeles, Calif., a corporation of California
Filed Apr. 18, 1960, Ser. No. 22,978
6 Claims. (Cl. 166—20)

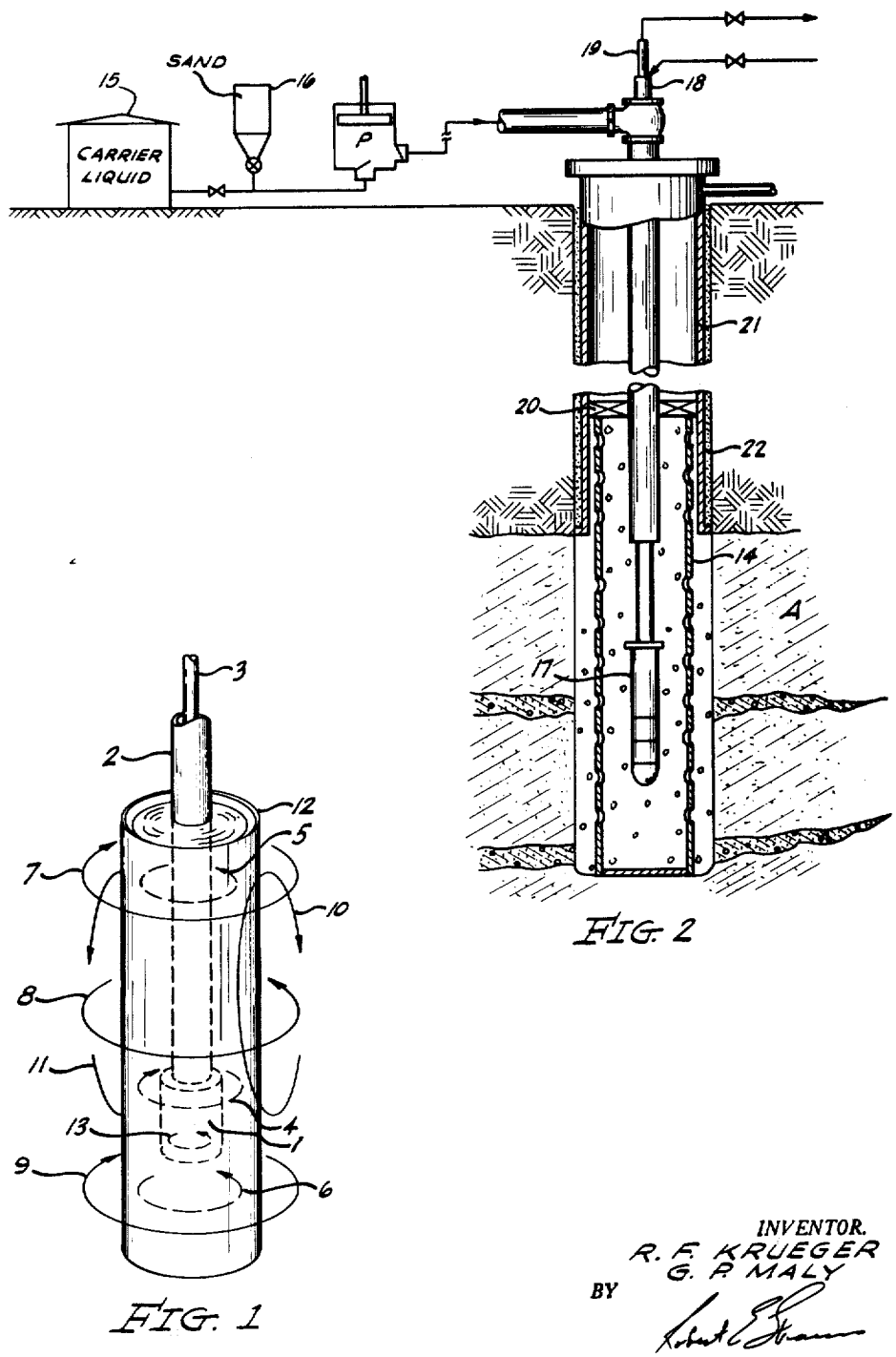

This invention relates to the treatment of oil wells, and in particular relates to a treatment of an oil well wherein fluids containing high concentrations of bodying solids are forced into the well. Typical of these treatments are the following: gravel and sand packing, hydraulic fracturing, high pressure sand squeezing, etc.

This invention comprises the use of a vibrating tool within the well bore during the treatment thereof with the fluid containing bodying solids to obviate difficulties previously encountered and to simplify such treatments.

One difficulty frequently encountered in well treatment by use of fluids containing bodying solids, be it in hydraulic fracturing, packing, or combined fracturing and packing, is that the solids tend to settle out of the fluid and into the well bore rather than penetrating into the fractures or through the perforations in the well casing. This settling difficulty, commonly referred to as "sand outs," limits the amount of solids which can normally be added to the treatment fluid to generally less than about five pounds per gallon and frequently to less than about two pounds per gallon. This is unfortunate since use of greater amounts of solids in the fluid, e.g., up to about 25 to 30 pounds per gallon is often desirable to achieve a dense uniform sand pack in the fracture and to hold open a greater flow area to the production fluid flow, as well as to reduce treatment costs by reducing the volume of carrier fluid required.

Another difficulty experienced in hydraulic fracturing is the tendency of the propping solids to wash back into the well bore and thereby be removed with the production fluids. When this occurs, the fractures are not held open and the treatment fails to achieve increased production.

Heretofore, the choice of solids as bodying agents has been limited. In hydraulic fracturing the solids are employed as propping agents which enter the fractures exposed by the high hydraulic pressures and hold open these fractures when the pressure is reduced. In the various packing treatments, the solids are forced into open or loosely consolidated regions of the formation under sufficiently high pressure to tightly pack the zone. For each of these treatments, solids having a high bridging tendency are desired. Solids having angular shapes are also desirable as they help to scour the formation during treatment. Yet the use of solids having high bridging and scouring characteristics, i.e., solids having up to about a 1:1 size ratio to the liner slots or fracture and having irregular shapes and sharp edges, is frequently not possible because such solids will bridge before they are forced into their desired location. Accordingly, sand particles having rounded edges and generally spherical shapes are widely employed. These sands are found in limited geographical areas and are more expensive than sand found locally because of transportation costs as well as the costs involved in the necessary screening steps to obtain a suitable narrow size range fraction.

Another difficulty encountered in gravel packing operations is the tendency of the gravel to pack or bridge before the operation is complete. Narrow annulus areas between the formation and the casing or the tubing are frequently encountered in the collapsed formation. When the void annular zone surrounding the well bore is gravel packed, this constriction annulus can cause bridging of the solids and prevent complete gravel packing of the remainder of the annular zone. To avoid this bridging, it has been heretofore necessary to carefully wash the sands away from the well bore throughout the loosely consolidated region so as to remove any sands which constrict the annular flow area surrounding the tubing. Even when the gravel does not bridge and complete fill-up is achieved, the gravel pack is frequently loosely packed and has many voids which do not completely prevent sand movement into the well. During production, this loose gravel pack is continually washed with incoming production fluids which tend to force the gravel into a more dense pack. When this occurs, a portion of the gravel pack is weakened and collapses.

The sand squeeze treatment consists of placing a carrier fluid with suspended sand into a well bore which penetrates a poorly consolidated interval and then imposing a high pressure on the fluid to drive the sand into said interval in a manner very similar to the aforementioned hydraulic fracturing treatment. As a result of this treatment, a very tight pack is achieved around the well bore and, often, fractures or channels formed by compressing the main body of the formation are opened within the interval and are filled with sand. These sand deposits filter out any sand in the production fluids before they reach the production tubing and the increased filter area achieved by the sand-filled fractures often increases production from the well. After the finer grade sand is placed, it is frequently followed by a coarser grade. Thereafter the sand pack is washed by injection of a wash fluid, e.g., crude oil, and the well is then completed to production. To complete the well, many methods have been proposed. These methods generally require the use of an inner screen liner which extends through the sand pack and which is placed into the well bore either before the sand-containing fluid is introduced or after the sand has been packed in the well. This screen has perforations or slots which permit the production fluids to enter the tubing but which are too small to permit the adjacent sands to pass therethrough and thus holds the sand pack in place. Conventional methods of placing the well into production after the sand pack is in place involve washing the screen into place in the sand pack or if the screen is placed before the packing operation, either removing the screen cap, or washing or bailing the sand from the interior of the screen. The screen is commonly washed into place by breaking the seal between the casing and the liner and circulating a wash fluid down the tubing through the screen and up the annulus.

It is a purpose of the invention to prevent sand outs in well treatments which involve the use of fluids containing suspended solids.

It is a purpose of the invention to permit use of greater amounts of solids in said fluids than heretofore possible.

It is a purpose of the invention to permit the use of coarse and angular solids having greater bridging tendencies in said fluids than heretofore possible, while avoiding bridging of the solids during the treatment.

It is also a purpose of the invention to prevent bridging of solids during a gravel packing treatment.

It is a purpose of the invention to reduce the number of steps heretofore required in a high pressure sand squeeze treatment.

It is also a purpose of the invention to facilitate the removal of sand from a screen after a high pressure sand squeeze.

Each of the aforementioned purposes is achieved by the use of a vibrating well tool in a manner hereinafter described.

The vibrating well tool employed can be any suitable electric or fluid actuated vibrator such as electromagnetic vibrator, a piezo-electric crystal, or an eccentric weight assembly driven by an electric or fluid motor. A preferred device is that disclosed by G. L. Malan in U.S. Patent 2,743,090, in which a fluid under pressure, e.g., air, drives a rotor in an eccentric path around a cylindrical race. This preferred device produces a vibrational field having a frequency between about 50 to 300 cycles per second having an amplitude between about 1.0 to 0.01 inch for power inputs between about 10 to 100 horsepower. The vibrational field establishes circulatory motion in the surrounding solids or fluids which is hereinafter described.

We have found that when loose solids or fluid suspensions of solids are subjected to a vibrational field of between about 50 to 1,000 cycles per second, the particles are placed in motion and tend to orient themselves so as to pass through openings that they cannot be forced through in the absence of the vibrational field. This is possible because the vibrational field place the particles in random motion exposing their smallest profile or dimension to the opening. When this occurs, the weight of the solids or a fluid pressure head exerted on the solids forces the particle through the opening. Thus, although particles normally bridge at openings which are twice the mesh spacing of the largest mesh screen size retaining 10 weight percent of the solids, hereinafter referred to as the average diameter of the 10 percentile fraction, we have been able to pass solids with ease through openings which are less than the maximum dimension of the solid and about equal to the minimum dimension of the particle by application of the aforementioned vibrational field.

The use of the vibration well tool in a subterranean well treatment comprises positioning the tool beneath the fluid level in the well bore. During the well treatment, be it fracturing, gravel packing or high pressure sand squeezing, the well bore is filled with the carrier fluid containing the desired solid particles in suspension. The vibrator is immersed within this fluid, connected to a source of motive power, e.g., pressurized air, electricity, etc., and the well bore is thereafter pressurized in the conventional manner. During this treatment, the vibrator is operated at a high frequency so as to keep the solids in motion and thereby prevent sand outs. By this method, high sand concentrations up to about 30 pounds of solids per gallon of carrier fluid can be maintained without the occurrence of sand outs. In a second embodiment, the sand is placed directly into the well bore, the vibrator (if not already in place) is then immersed beneath the sand level and adjacent the interval to be treated, and the remainder of the well bore is filled with a liquid. During the treatment the well bore is pressurized in a conventional manner and the vibrator is actuated to force the particles into the formation. By this technique, the volume of injected fluid is greatly reduced and the need to pre-mix a carrier fluid with the solids can be eliminated.

The invention as applied to hydraulic fracturing comprises placing a slotted liner or screen in the well bore adjacent the region to be fractured. The relative sizes of the solids to the liner slots is chosen by selection of a solid size, liner slot, or both, so that the solids will normally bridge and not pass through the slots. Frequently, the liner will be in place in the bore hole and in these instances the solids are so sized that they will normally bridge in the liner. The fracturing fluid is injected into the well bore through the slotted liner under sufficient pressure to lift the overburden and fracture the formation. Thereafter, the solids are added to the fluid and bridging of the solids is prevented by the vibration of the vibrator tool. After the fracture is opened and the solids introduced therein, the fracturing fluid is displaced by a second fluid free of solids and, thereafter, the vibrator is shut down and the pressure on the well bore is reduced. When the well is put into production, the production fluids enter the well bore by passing through the slots in the liner, but the propping solids in the absence of any vibrational force will be unable to pass through the liner and will thus be held in place in the formation. By this method, sand production after hydraulic fracturing can be eliminated.

The application of the invention to gravel packing comprises inserting the vibrator tool within the well bore adjacent the cavity to be gravel packed and operating it while the gravel is being placed in the cavity. The gravel can be placed between the well screen or liner and the adjacent walls of the formation by merely dumping the gravel into the annular space of the well between the production tubing and the casing or by circulating a suspension of gravel in a carrier fluid down the production tubing and removing the carrier liquid up the annulus (direct flow) or down the annulus between the tubing and the casing and removing the carrier fluid up the tubing (reverse flow). In these operations, the afore-described bridging tendency is a problem resulting in loosely packed gravel screens. When this occurs the formation can shift during production and the gravel pack will thus not be completely effective for reducing sand production. This bridging tendency, however, is eliminated by the vibrational force exerted by the vibrator during the gravel packing. As a result, very dense and uniform gravel packs are obtained throughout the entire cavity without danger of gravel bridging or clogging in the constricted flow areas. Sagging of the gravel pack during production as a result of gravel particles washing into a more dense pack surrounding the screen or liner cannot occur because the gravel has been packed to the maximum by the vibrational field. Because the gravel and slots are sized such that the gravel can pass through the slots only in the presence of the vibrational field, subsequent production of the well will not wash gravel from the packed zone into the production tubing.

When applied to the high pressure sand squeeze operation, the invention consists of positioning the vibrating mechanism within the well bore adjacent or within the slotted liner which is opposite the interval to be treated. The fluid containing the sand is then injected into the well using conventional hydraulic fracturing equipment, and the well bore is pressurized sufficiently to squeeze or force the fluid into the formation. During this treatment, the vibrator is actuated to prevent sand outs and to prevent the sand from bridging on the inside of the slotted liner. After sufficient sand has been injected as indicated in the conventional manner, e.g., by comparison of the injected sand volume with the annular volume to be filled, by observing the pressure rise during injection, etc., a fluid free of solids is injected to remove the sand from the interior of the liner and thereafter the vibrator is shut off and the fluid injection stopped. After the injection equipment is removed, no further treatment of the well is necessary, since the slotted liner is in place, free of sand. No subsequent sand production will be observed because the sand which has been squeezed into the formation under the applied pressure and vibrational field cannot enter the slotted liner unless a vibrational field is again applied. By this method, satisfactory sand packing and combined fracturing and sand packing can be conducted without the previously necessary steps either of washing the slotted liner into place or removing the sand which deposited in the liner during the treatment.

In some instances, the slotted liner or screen is filled with sand at the completion of the sand squeeze operation, e.g., the vibrator may be shut down before the sand within the slotted liner is completely displaced by wash fluid. In other instances, the screen may be filled with sand because the vibrator was not used during the treatment. In these cases, it is necessary to remove the sand from within the liner. This is suitably accomplished by lowering the vibrator down the tubing and working it into the sand pack. Then a stinger, or tubing extension, is run down the tubing with its lower end resting on the sand pack. A wash fluid is pumped down the annulus between the production tubing and well casing and removed through the stringer and up the tubing. As the wash fluid passes through the screen and into the stringer, the vibrational field exerted on the sand pack disperses the sand in the wash fluid which is removed through the lower end of the stringer and up the tubing to the earth's surface as a suspension. By this method the well is readily completed without resort to time consuming bailing operations.

The invention will now be described in detail, illustrating the preferred mode of operation and the necessary operational conditions, with reference to the several figures of the accompanying drawings in which:

FIGURE 1 illustrates the vibrational field established by the preferred vibrator;

FIGURE 2 illustrates the invention as applied to hydraulic fracturing;

Figure 3:
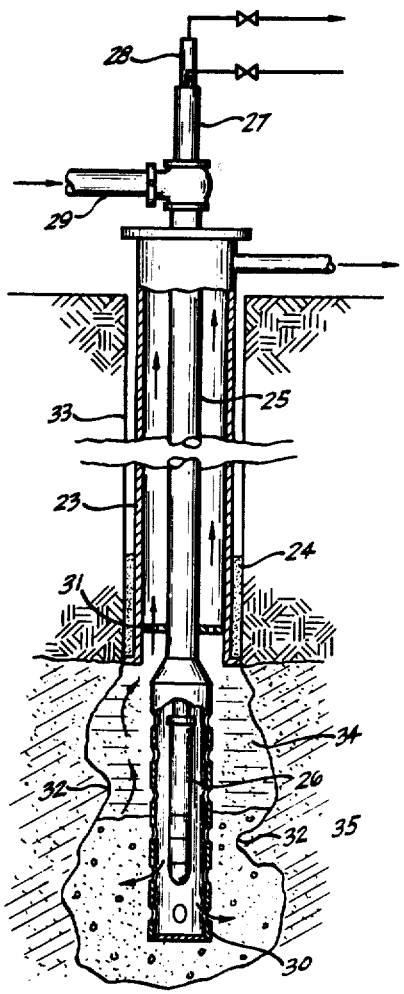
FIGURE 3 illustrates the invention as applied to gravel packing.

Referring now to FIGURE 1, there is illustrated the pattern of the vibrational field which is established by the preferred vibrator. The vibrator 1 is shown positioned within a cylindrical shell 12 which is filled with a fluid or finely divided solids such as sand, gravel, etc. The operative fluid, e.g., air is supplied to the vibrator through conduit 2 and is removed via concentric tubing 3. Operation of the vibrator consists in rotating a weighted ball around a cylindrical race in the direction indicated by line 13. This movement establishes a counter rotational movement 4 of the surrounding fluid or sand grains adjacent the vibrator. Alternate sections of the fluid or sand above and below the vibrator are also placed into motion, but rotate counter to that shown by line 4. This movement is shown by lines 5 and 6. When cylinder 12 is surrounded by a body of fluid or sand, e.g., a casing or screen in unconsolidated sand, rotational forces are also set up in the surrounding body. Rotation in the vertical plane within the surrounding body is established as shown by lines 10 and 11. Rotation in successive horizontal planes is established as shown by lines 7, 8 and 9, the rotation being counter to the rotation within the cylinder. The lines of force which are established by the vibrator are shown in FIGURE 1 as a single line for each force. Individual sand grains or particles subject to these forces are also given rotational movement about their axis as well as a random oscillatory movement by particle-to-particle impact.

Referring now to FIGURE 2, there is depicted a subterranean well bore which penetrates into a consolidated oil production interval A which is to be fractured to increase the oil production. This interval is shown to extend to the base of the well bore; however, similar intervals are frequently encountered along the depth of the well bore. In such instances, it is within the scope of the invention to isolate these intervals by packers in the conventional manner employed for hydraulic fracturing. The well bore is shown to be lined with casing 21 for a portion of its depth. This casing is held firmly in place by cement 22 which fills all or a portion of the annulus between the casing and the well bore. Prior to fracturing, screen or slotted liner 14 is positioned within the bore hole opposite the interval to be fractured and packer 20 is positioned in the well to isolate this interval. The size of the slots or perforations of this liner are sized in regard to the size of propping solids employed in the fracturing liquid in a manner hereinafter described. The liner is illustrated as having substantially the same diameter as the casing into which its upper end extends. If desired, it can be of a lesser diameter and be spaced in the casing by protruding lugs or it can be attached directly to the production tubing. The upper end of the production tubing is connected to suitable hydraulic fracturing equipment comprising pump P, liquid tank 15, and solids reservoir 16. Suspended within the well bore is the vibrator tool 17 which is supported by concentric pipe strings 18 and 19 which also serve to supply and remove the motive fluid for the vibrator.

Hydraulic fracturing of interval A is achieved by pumping a fracturing liquid into the well under pressures in excess of the formation breakdown pressure, i.e., in excess of the pressure necessary to cause the formation to part or fracture. This pressure is approximately equal in pounds per square inch to the depth of the formation in feet, but varies somewhat depending on the nature and depth of the formation. Formation parting is often indicated by a rapid drop in pressure when the liquid is being pumped into the well. Liquids which are best suited as fracturing liquids are characterized by low penetration rates in the formation so as not to filter through the formation. A common fracturing liquid is in the form of a hydrocarbon gel obtained by dispersing a suitable gelling agent in a relatively light hydrocarbon such as gasoline, kerosene, or even light crude. Commonly employed gelling agents include aluminum naphthenate and mixtures thereof with aluminum oleate, hydroxy aluminum soaps of tall oil and fatty acids, aluminum and other metal soaps of various fatty acids derived from coconut oil, peanut oil, etc., organophilic colloids, and the like. The use of such agents to prepare suitable hydrocarbon gels is well understood in the hydraulic fracturing art, and the particular technique involved, i.e., proportions, mixing temperature, etc., depends somewhat upon the particular gelling agent employed. A number of agents specifically formulated for preparing fracturing gels are available commercially, e.g., "Nuodex," and their manner of use is clearly described by the manufacturer. Aqueous fracturing fluids may also be employed in locations where the producing formations are not damaged by water. Gelled acids may also be employed, and in some instances more or less heavy crudes or viscous refined oil alone may be used. The essential requirements of the fracturing liquid is primarily one of suitable viscosity rather than one of chemical composition, and any inert fluid of satisfactory viscosity may successfully be employed. The viscosity should be between about 30 and about 5000 centipoise (Stormer at 600 r.p.m.) and is preferably between about 75 and about 300 centipoise. The term "low-penetrating liquid" is customarily understood in the hydraulic fracturing art to refer to a liquid having a retarded tendency to filter through permeable media and having a viscosity satisfactory for use in fracturing subterranean earth formations. Solids which are deposited within the fractures and serve to hold the fracture open after the liquid is removed are added to the liquid. Sand is commonly employed for this purpose and is well suited for use in the invention, although other solids such as inert aggregates, clay, walnut shells, metal, ceramic and glass can also be employed. The sand used commonly has a size range between about 20 to 40 mesh (0.033 to 0.017 inch) but sizes as large as 3 mesh (0.26 inch) and as small as 60 mesh (0.01 inch) can be used. The average diameter of the ten percentile fraction correspondingly varies between about 0.25 and 0.02. This sand is added to the liquid in concentrations between about 1 and 30, preferably between about 5 and 25 pounds per gallon.

As previously mentioned, the relationship of the slot or perforation size to the solids is chosen so as to normally cause bridging of the sand. This relationship requires that the maximum slot size be less than about twice the average diameter of the 10 percentile portion of the sand, i.e., the screen size which retains the 10 percent fraction of the sand. The minimum slot size should be also at least as great as the minimum dimension of the largest particle size to permit passage of all the sand grains under the vibrational field. Preferably the relationship between the slot size and the solids is such that the slot size is between about 1.5 and 2.0 times the average diameter of the 10 percentile sand. When employing a conventional 20–40 mesh Ottawa sand having a 10 percentile grain size of about 0.028 inch, the liner slot size should be between about 0.033 and 0.056 inch, preferably between about 0.042 and 0.056 inch.

The fracturing operation itself is conventionally carried out by introducing the fracturing liquid into the well bore via the well tubing or casing. The fracturing liquid is followed by a charge of crude oil or other suitable driving liquid, which follow-up liquid is continuously pumped down the tubing until the overburden pressure is exceeded and fracturing occurs. Such fracturing is generally indicated by a sudden decrease in the pump pressure. Further pumping forces the fracturing liquid farther into the fractured formation and lengthens the fractures. In a typical operation, the pressure required to force the liquid down the well tubing may rise rapidly to, say, 2500 p.s.i. over a period of 5–10 minutes, level off at this value for 30 minutes while the fracturing fluid is being forced into the formation, rise rapidly to, say, 3400 p.s.i. over a period of 2–5 minutes, and then decline more or less rapidly to, say, 2000 p.s.i. and remain at such value while the fracture is being extended. The fracturing is generally accomplished with a low penetrating liquid free of solids. After the fracture is opened, sand is added to the low penetrating liquid and the vibrator tool 6 is actuated by supplying air at about 100 p.s.i. to conduit 7 and removing the exhausted air via conduit 8. The vibrator is operated at a frequency between about 50 and 1000 cycles per second, preferably between about 60 and 200 cycles per second. In general, the lower frequencies are preferred to avoid any possibility of breaking down the low penetrating liquid or destroying its gel characteristics, yet frequencies above about 50 cycles per second are necessary to prevent the solids from bridging inside the liner. When it has been determined that sufficient fracturing has been attained or when further fracturing becomes impossible, the operation is ceased by shutting off the vibrator and reducing the pressure on the well.

When the fracturing fluid is a self-reverting gel, e.g., a "Napalm" gel which reverts from a gel to a low viscosity sol upon the mere passage of time or upon contact with well fluids, no viscosity-reducing or gel-breaking agent need be introduced into the fractured formation before the fracturing fluid can be withdrawn therefrom and the well placed on production. The gel is simply allowed to remain in the formation under pressure until it liquefies of its own accord or as a result of contacting the well fluids, and upon putting the well back in production it will be displaced from the formation by the flow of well fluids therethrough and be withdrawn from the well along with the well effluent. The propping agent is deposited and remains behind in the fractures to keep the latter from closing when the pressure is released.

Usually, however, a gel-breaking or viscosity-reducing agent is employed to reduce the viscosity of the fracturing fluid, and in such case the follow-up charge will comprise such agent which is often in turn followed up by a charge of a suitable driving liquid. Such agent may comprise salt brine, aqueous mineral acid, amine solutions, oil-soluble petroleum sulfonates, etc. In some instances a small charge of crude oil or other suitable liquid may be interposed between the fracturing fluid and the viscosity-reducing agent. When the action of the viscosity-reducing agent has become complete and the viscosity of the fracturing liquid is thereby reduced to a value of the same order of magnitude as that of the well fluids, the pressure is released and the well is placed on production, whereupon the fracturing fluid and the viscosity-reducing agent will be withdrawn from the well as part of the well effluent.

Subsequent sand production into the well by displacement of the sand and propping agent from the fracture is not possible since the liner 14 effectively blocks the sand and prevents its entry into the production tubing. By use of the vibrator during the solid placement in the fractures, it is possible to place the maximum-sized solids within the fracture thereby insuring that the fractures will be retained in their maximum open position after the fluid pressure is reduced.

Referring now to FIGURE 3, the invention is illustrated as applied to a gravel packing operation. As shown, well bore 33 extends beneath the earth's surface to subterranean cavity 34 which has been formed by the collapse of the poorly consolidated sands in the oil producing interval 35. The well bore is lined throughout all or a portion of its depth with casing 23, which is cemented at its lower end 24. The production tubing 25 extends into the subterranean cavity and terminates in cylindrical screen or slotted liner 30, within which the vibrational tool 26 is suspended. As shown, this is a pneumatically operated tool having air supply line 27 and exhaust line 28.

In operation, the vibrational tool is actuated and a fluid containing suspended gravel is pumped into the production tubing through line 29 and passes through screen 30 into the cavity. Within the screen, the vibrational field is at its maximum intensity and the coarse gravel is retained in suspension and forced through the screen openings. Within the cavity, however, the vibrational field is less intense, and the coarse gravel particles fall out of suspension and are compacted by the weak vibrational force into a dense mass. The carrier fluid reverses its flow and flows upwardly into the annulus and through the screen in packer 31. If desired, a ring (not shown) of a resilient material, e.g., rubber, can be positioned between the production tubing and this packer to dampen vibration of the screen and thus prevent entrainment of the gravel particles past the screen in the packer. Also, if desired, the vibrator can be directly coupled to the screen by annular rubber or plastic rings. Although the vibrational field within the cavity is insufficient to maintain suspension of the gravel in the carrier, it is nevertheless sufficient to prevent bridging in the gravel pack. This is best shown by reference to the protuberant portions 32 of the cavity walls which greatly reduce the flow path for the gravel suspension. In the absence of vibrational energy, the gravel would tend to bridge at these points and thus prevent complete packing of the cavity. With the vibrator in operation, however, the gravel is vibrated sufficiently that it cannot bridge against the screen at these points, and complete compacting of the cavity is thereby attained. By this method, conventional techniques to place the gravel behind the screen, e.g., use of a crossover tool, are not necessary. Any of the commonly employed fluids can be used as carrier fluids, such as water, thickened salt water, crude oil and thickened crude oil, acid-kerosene gels, etc. Gravel sizes of between about 0.02 to 0.75 inch with 10 percentile points between about 0.025 to 0.50 inch can suitably be employed. To prevent subsequent gravel production into the screen, it is preferred to employ screens having a slot size between about 1–2 times, and preferably between about 1.5–2 times the 10 percentile diameter of the gravel.

Figure 4:
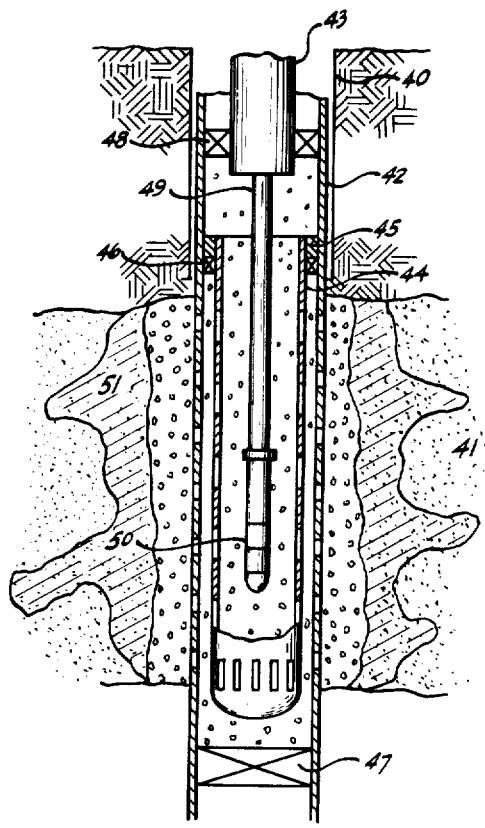
FIGURE 4 illustrates the invention as applied to sand squeezing.

Referring now to FIGURE 4, the invention will be described in its application to a high pressure sand squeeze operation. There is illustrated bore hole 40 passing through a poorly consolidated production interval, 41. The hole is lined with perforated casing 42, and has central production tubing 43. A screen or slotted liner, 44, is hung in the casing and extends throughout the loosely consolidated interval, being supported by lugs 45 which rest on stops 46. The region to be packed is preferably sealed off by packers such as 47 shown beneath the zone and upper packer 48 between the tubing and the casing. The vibrator is suspended within the screen on concentric tubings 49 similar to those shown in FIGURES 1 and 2.

In operation, the vibrator is actuated and a carrier liquid, suitably any of the aforementioned liquids, containing a sand suspension is pumped into the well through the production tubing. This fluid passes through the liner slots and, under the vibrational field, the sand particles remain suspended in the liquid and are forced into the formation under applied pressure, the magnitude of which in p.s.i. is equal numerically to from about 0.2 to about 2.0 times the overburden thickness in feet. This results in the formation of tightly packer regions of sand 51 which extend into the formation. This sand pack can be placed throughout the cavity up to the screen. If desired, the region surrounding the screen can be packed with a coarser sand as shown in FIGURE 4. This is achieved by simply mixing a coarse sand with the carrier fluid rather than the fine sand initially used. After the sand pack is in place (indicated in the conventional manner, such as by comparison of the injected sand volume with the annular volume to be filled, or by pump pressure increases during injection), the well is washed by injection of any suitable wash fluid, e.g., clean crude oil. During this washing the vibrator remains in operation until all the sand has been removed from the inside of the screen. When sufficient wash fluid has been injected to insure removal of the sand from inside the liner, the vibrator is shut down and the well is continued to be washed in the conventional manner. To prevent overflushing, the fluid injection rate and pressure should be reduced near the end of this treatment. Thereafter, injection of wash fluid is stopped, the vibrator is withdrawn, and the well placed into production. The screen will be found to be surrounded by a very densely packed sand formation and no sand production will occur because the sand surrounding the screen cannot pass through the slots in the absence of a vibrational field. The sand size range for this operation is generally between about 0.03 and 0.26 inch, depending upon slot size to be bridged. The maximum liner slot or perforation size is generally no greater than about twice the diameter of the 10 percentile fraction of the sand which is between about 0.25 and 0.028 inch.

Other modes of applying the principle of our invention can be employed instead of those explained, change being made as regards the methods or materials employed, provided the step or steps stated by any of the following claims or the equivalents thereof be used.

We claim:

1. In a process for treating subterranean oil wells wherein a fluid containing between about 1 and 30 pounds of suspended solids per gallon is injected into a well and therein passed outwardly through a foraminous member into the formation, the improved method of avoiding sand outs and sand production into the well bore after completion of said treatment, which process comprises: injecting said fluid into said well bore and imposing a vibrational field with a frequency between about 50 and 300 cycles per second on said fluid within said well bore; adding said solids to said fluid, the maximum size particles of said solids having minimum cross-sectional dimensions no greater than about the minimum dimension of the foramina of said foraminous member so that in the presence of said vibrational field said particles will pass through said foramina and the ten percentile fraction thereof having an average diameter no less than about half the maximum dimension of said foramina; so that in the absence of said vibrational field said particles will bridge said foramina; continuing said injection of said fluid and application of said vibrational field until said treatment is completed; and thereafter injecting into said well a fluid free of suspended solids while continuing said application of said vibrational field.

2. The use of a vibrational field in the method of hydraulically fracturing a subterranean formation penetrated by a bore hole which comprises; positioning within said bore hole opposite said formation a foraminous member, isolating said formation and said foraminous member from the remainder of said bore hole, forcing into said well bore, through said foraminous member and into said formation a fracturing liquid having a viscosity between about 30 and 5000 centipoise and imposing a hydraulic pressure expressed as p.s.i. on said liquid between about 0.5 and 2.0 times the overburden thickness expressed in feet, sufficient to fracture said interval, adding solids to said liquid prior to the discharge thereof through said foraminous member, the maximum size particles of said solids having minimum cross-sectional dimensions no greater than about the minimum dimensions of the foramina of said foraminous member so that in the presence of said vibrational field said particles will pass through said foramina and the ten percentile fraction thereof having an average diameter no less than about half the maximum dimension of said foramina; so that in the absence of said vibrational field said particles will bridge said foramina; applying said vibrational field to said liquid having a frequency between about 50 and 300 cycles per second; continuing the addition of said solids until said treatment is completed and thereafter injecting into said well a fluid substantially free of suspended solids while continuing the application of said vibrational field.

3. The use of a vibrational field in the method of packing a cavity within a subterranean formation penetrated by a bore hole having a centrally disposed production tubing which method comprises; positioning a foraminous member opposite said formation and in fluid communication with said production tubing, circulating a fluid downwardly through said production tubing, outwardly through the foramina of said foraminous member, into said cavity and upwardly through the annulus between said production tubing and the wall of said bore hole, adding solids to said fluid, the maximum size particles of said solids having minimum cross-sectional dimensions no greater than about the minimum dimensions of said foramina so that in the presence of said vibrational field said particles will pass through said foramina and the ten percentile fraction of said solids having an average diameter no less than about half the maximum dimension of said foramina so that in the absence of said vibrational field said particles will bridge said foramina, depositing said solids within said cavity while applying to said fluid within said bore hole said vibrational field having a frequency between about 50 to 300 cycles per second, continuing to said solids to said fluid until said cavity is completely filled with said solids, thereafter discontinuing the addition of said solids while continuing to inject said fluid until said foraminous member is substantially free of solid particles.

4. The use of a vibrational field in the method of sand squeezing a subterranean formation penetrated by a bore hole which comprises; positioning within said bore hole and opposite said formation a foraminous member, forcing a fluid outwardly through the foramina of said member into said formation, adding solids to said fluid, the maximum size particles of said solids having minimum cross-sectional dimensions no greater than the minimum dimensions of said foramina so that in the presence of said vibrational field said particles will pass through said foramina, and the ten percentile fraction of said solids having an average diameter no less than about half the maximum dimension of said foramina so that in the absence of said vibrational field said particles will bridge said foramina, applying a vibrational field to said fluid within said bore hole, continuing to inject said fluid and apply said vibrational field until said solids are deposited a substantial distance in said formation, thereafter discontinuing the addition of said solids to said fluid and continuing injection of said fluid and application of said vibrational field until said foraminous member is substantially free of said solids.

5. The use of a vibrational field in a method of transferring solids in a fluid suspension from a first zone to a second zone and returning said fluid to said first zone while preventing the return thereto of said solids which comprises positioning a foraminous member between said zones, said member having foramina which in the absence of said vibrational field are bridged by said solids, supplying said solids in a fluid suspension to said first zone at a pressure greater than the pressure in said second zone, applying said vibrational field to said fluid having a frequency between about 50 and 1000 cycles per second to thereby cause said solids to pass through said foramina, closing the supply of said solids to said first zone and discontinuing the application of said vibrational field when said foraminous member is free of said solids and reducing said pressure in said first zone to permit said fluid to return to said first zone.

6. The method of claim 5 wherein said first zone is a well bore, said second zone is a subterranean formation penetrated by said well bore and said foraminous member is a perforated well bore liner.

References Cited in the file of this patent
UNITED STATES PATENTS

| | | |
|---|---|---|
| 2,072,982 | Dale | Mar. 9, 1937 |
| 2,896,714 | Killingsworth | July 28, 1959 |
| 2,915,122 | Hulse | Dec. 1, 1959 |

UNITED STATES PATENT OFFICE
CERTIFICATE OF CORRECTION

Patent No. 3,113,621  December 10, 1963

Roland F. Krueger et al.

It is hereby certified that error appears in the above numbered patent requiring correction and that the said Letters Patent should read as corrected below.

Column 10, line 53, after "to", first occurrence, insert -- add --; column 12, line 1, for "closing" read -- ceasing --.

Signed and sealed this 26th day of May 1964.

(SEAL)
Attest:

ERNEST W. SWIDER
Attesting Officer

EDWARD J. BRENNEL
Commissioner of Patents